US011314338B2

(12) United States Patent
Wilcox

(10) Patent No.: US 11,314,338 B2
(45) Date of Patent: Apr. 26, 2022

(54) LOCALLY CONNECTED SYSTEM FOR REMOTE TECHNICAL SUPPORT

(71) Applicant: GENERAL ELECTRIC COMPANY, Schenectady, NY (US)

(72) Inventor: Daniel Wilcox, Van Buren Township, MI (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 17/029,220

(22) Filed: Sep. 23, 2020

(65) Prior Publication Data
US 2021/0191531 A1 Jun. 24, 2021

Related U.S. Application Data

(60) Provisional application No. 62/953,256, filed on Dec. 24, 2019.

(51) Int. Cl.
*G06F 3/023* (2006.01)
*G06F 8/61* (2018.01)
*G06F 13/42* (2006.01)

(52) U.S. Cl.
CPC .............. *G06F 3/0238* (2013.01); *G06F 8/63* (2013.01); *G06F 13/4282* (2013.01); *G06F 2213/0042* (2013.01)

(58) Field of Classification Search
CPC ...... G06F 3/0238; G06F 8/63; G06F 13/4282; G06F 2213/0042
See application file for complete search history.

(56) References Cited

U.S. PATENT DOCUMENTS

| | | | |
|---|---|---|---|
| 6,530,078 B1* | 3/2003 | Shmid ................. | G06F 9/45537 703/27 |
| 2004/0078503 A1* | 4/2004 | Zaudtke ................. | H04L 67/36 710/72 |
| 2010/0265183 A1* | 10/2010 | Mail .................... | G06F 3/04895 345/168 |
| 2016/0139945 A1* | 5/2016 | Griffith ..................... | G06F 8/63 711/162 |
| 2018/0329856 A1* | 11/2018 | Mishra .................... | G06F 13/20 |

* cited by examiner

*Primary Examiner* — Henry Tsai
*Assistant Examiner* — John B Roche
(74) *Attorney, Agent, or Firm* — Buckley, Maschoff & Talwalkar LLC

(57) ABSTRACT

Provided is a service system and method that allows a remote user to plug-into an external device (e.g., a server, a laptop, a desktop, etc.) and control a local keyboard input of the troubled device, remotely. In one example, the method may include receiving, via a first adapter connected to a mobile device, keyboard commands from the mobile device, converting the received keyboard commands into corresponding keyboard emulation signals of an external computing system, and transmitting, via a second adapter connected to the external computing system, the keyboard emulation signals to control a local keyboard input of the external computing system.

15 Claims, 6 Drawing Sheets

LOCALLY CONNECTED SYSTEM FOR REMOTE TECHNICAL SUPPORT

CROSS-REFERENCE TO RELATED APPLICATIONS

This application claims the benefit of U.S. Provisional Patent Application No. 62/953,256, filed on Dec. 24, 2019, in the United States Patent and Trademark Office, the entire disclosure of which is hereby incorporated herein for all purposes.

BACKGROUND

Due to recent events, many organizations have embraced the concept of working from home (i.e., working remotely). Furthermore, many organizations have users that must travel on a regular basis. Thus, organizations may provide users with a laptop or other device along with remote login credentials for accessing servers, services, storage, and the like, of the organization. As a result, a user can seamlessly stay connected with the organization and its data and applications as if they were in the office.

However, a problem arises when users encounter technical issues while working computing devices remotely. Many users are hours away by automobile from an onsite service technician. Furthermore, it may not be feasible for a service technician to travel/visit with users at their remote locations due to time constraints. Thus, users are often limited to allowing the service technician to remotely access/login to their device. However, the remote access is limited to situations where the user's device is functional (powered on) and the network connection is present. Meanwhile, if the device will not power up or the network connection is down, the service technician cannot remotely access the troubled device.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Figure 1:
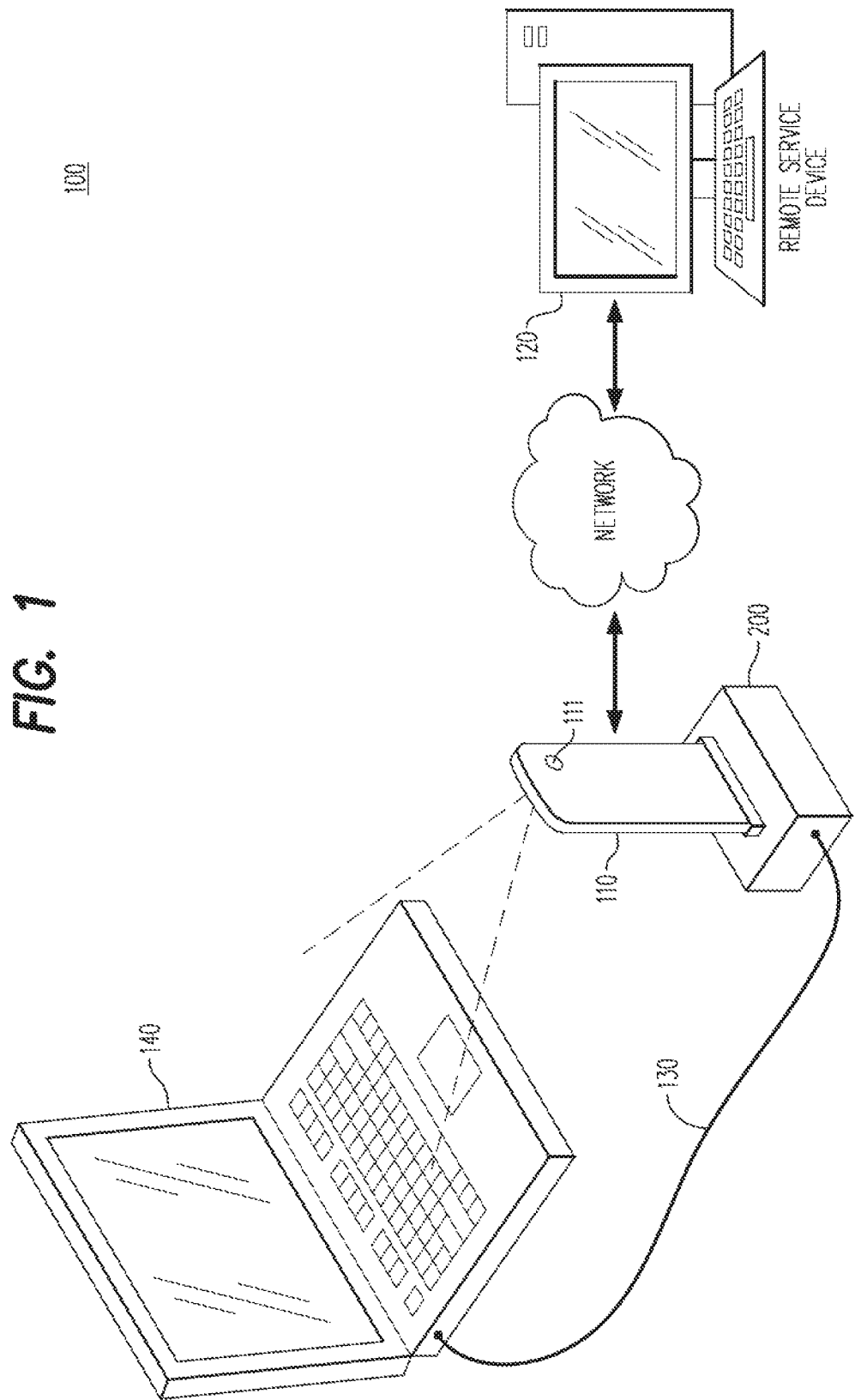
FIG. 1 is a diagram illustrating a computing environment including a locally-connected service system in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

Online remote support (technical support) may be provided to computing devices from service technicians that are not physically present at the computing device. For example, the service technician may access the computing device using remote-controlled software to inspect and troubleshoot issues, perform maintenance, make repairs, and perform any other aspects of technical support. The service technician may establish a remote session directly between the service technician's device the troubled computing device which gives the remote technician access to software that is running on the troubled computing device. Once the service technician has finished the service, they can terminate the remote session.

However, remote technical support to a malfunctioning or troubled computing device is limited. For example, the troubled computing device must be able to turn on and it must have access to a network to allow the remote service technician the ability to connect. If the computing device has a slow internet connection or no internet connection, the remote service is not possible. Likewise, if the troubled computing device cannot turn on, the remote service is not possible. In addition, during the troubleshooting, a remote technician may need to reboot the computer to clear error codes, install/update software, etc. In such a case, the reboot will cause the remote service session to be terminated thus requiring the service technician to create a new connection with the troubled computing device. Furthermore, it is difficult for a remote technician to access BIOS (i.e., Basic Input/Output System) because BIOS is typically only accessible during start-up of the computer, and before the operating system is functioning.

The example embodiments are directed to a locally-connected service system that can plug into a port of a troubled computing device such as a server, a laptop, a personal computer, and the like, and provide a remote user (e.g., a service technician, etc.) with physical access to the troubled computing device even when there is no network connection or power to the troubled computing device. The locally-connected service system may also pair with or otherwise connect to a mobile device which includes control software that allows the remote technician to issue commands to the locally-connected service system that are then forwarded to the troubled computing device. Furthermore, the mobile device may include a camera that can feed back a video of the troubled computing device (e.g., ports, cables, connections, switches, status messages, error codes, etc.) to the remote service technician. In some embodiments, the locally-connected service system and the mobile device may ship to the customer as a package. As another example, the locally-connected service system and the mobile device may be maintained on site.

The locally-connected service system may include various adapters or ports such as a universal serial bus (USB) port, a console port, a lightning port, a mini-USB, a serial emulator, etc. which allow the locally-connected service system to physically connect (i.e., via a cable) to a corresponding port of the troubled computing device. The adapters enable the locally-connected service system to establish a physical communication path between the remote service technician and the trouble computing device.

According to various embodiments, the locally-connected service system further includes a keyboard emulator that emulates the presence of a keyboard on the troubled computing device. Here, the keyboard emulator may transmit a signal to the troubled computing device that identifies the locally-connected service system as a physical keyboard. Most computing systems will detect a keyboard even during power-up. When a power outage or other scenario causes the troubled computing device to reboot, the troubled computing device will detect the locally-connected service system as if it were a keyboard locally attached to the troubled computing device.

Furthermore, the locally-connected service system may be in the form of a mobile device dock or other connector which allows the mobile device (e.g., a mobile phone, tablet, etc.) to pair with the locally-connected service system. For example, the locally-connected service system may include a cradle or other opening or slot which allows the mobile device to sit therein and electrically connect to the mobile device via a USB connection, mini-USB, lightning, etc. A remote service technician may access the mobile device that is paired with the locally-connected service system, and control the locally-connected service system to issue keyboard commands to the troubled computing device as if the remote user were accessing the troubled computing device via a keyboard that is locally attached to the troubled computing device.

The keyboard emulator of the locally-connected service system can maintain a physical connection/presence between the remote service technician and the troubled computing device even when the troubled computing device has no network connection or has no power. The remote service technician can use an additional remote device to wirelessly connect to the mobile device (e.g., via a network interface, etc.) of the mobile device. Thus, the remote service technician can enter commands on a remote device that are transmitted to the mobile device, that are then transmitted to the troubled computing device via the locally plugged-in connection between the locally-connected service system and the troubled computing device.

In some embodiments, the locally-connected service system may be equipped with a storage device which includes software (e.g., scripts, operating system images, drivers, etc.) that can be downloaded to the troubled computing device through a local connection. Here, the locally-connected service system may function as an external hard drive that includes all the necessary data for formatting the operating system of the troubled computing device.

FIG. 1 illustrates a computing environment 100 including a locally-connected service system 200 in accordance with an example embodiment. Referring to FIG. 1, an external computing device 140 may be serviced by a remote service device 120 via the locally-connected service system 200 and a mobile device 110. Here, the external computing device 140 may be a device that is suffering from some issue such as a connectivity issue, a virus, a printer problem, an operating system error, a software error, or the like.

In this example, the locally-connected service system 200 may connect to the external computing device 140 through a cable 130. Thus, a physical connection can be established between locally-connected service system 200 and the external computing system 140. Therefore, if the external computing system 140 were powered off, unable to connect to a network, or otherwise unavailable, the locally-connected service system 200 is still able to connect to the external computing device 140 via the cable 130. In some embodiments, the cable may be a USB cable that connects between corresponding USB ports of the external computing device 140 and the locally-connected service system 200.

Meanwhile, the mobile device 110 may physically or wirelessly connect to the locally-connected service system 200. In this example, the mobile device 110 sits inside a cradle (not shown) of the locally-connected service system 200. Thus, the locally-connected service system 200 can act as a dock for the mobile device 110 thereby electrically and physically pairing (or coupling) the mobile device 110 to the locally-connected service system 200 via a port on the underneath side of the mobile device 110 such as a mini-USB, lightening, etc. here, the locally-connected service system 200 may include a corresponding port to make such connection.

During operation, a remote user such as a remote service technician may control the remote service device 120 (i.e., computing system) to establish a network connection with the mobile device 110 using a network. For example, the remote service device 120 may connect to the mobile device 110 through a wireless network such as a cellular network, a satellite network, a Wi-Fi network, or the like. Any type of network can be used between the remote service technician 120 and the mobile device 110.

The mobile device 110 may include software installed therein which allows the remote service device 120 to send commands such as keyboard inputs (e.g., key presses on a keyboard, etc.). The received keyboard commands may then be passed from the mobile device to the external computing device 140 via the locally-connected service system 200. Here, the locally-connected service system 200 may include a keyboard emulator which receives the commands from the mobile device 110 and transmits the commands as keyboard emulation signals to the external computing device 140, via the cable 130. Thus, the external computing device 140 receives the commands from the keyboard emulator as if they are being transmitted from a keyboard that is locally attached to the external computing device 140.

The mobile device 110 also includes a camera 111 which can capture an image, a video, a live feed, etc., of the screen of the external computing device 140 (or any other area around the trouble computing device 140 such as cable connections, etc.) and send the captured image data back to the remote service device 120. Thus, the remote service technician can visually see what the screen says on the external computing device 140.

Due to the keyboard emulator, the locally-connected service system 200 is able to mask or otherwise appear as if it were a physical keyboard that is attached to the external computing device 140 via a port of the external computing device, such as a USB port. Accordingly, the locally-connected service system 200 may send commands, instructions, keyboard inputs, etc., to the external computing device 140 when the device is powered off, during a start-up (e.g., to access BIOS, etc.), and the like. The locally-connected service system 200 may also remain connected (physically) to the external computing device 140 when the external computing device 140 powers down, restarts, or the like, without having to re-establish a connection.

Accordingly, when connected, the remote service technician may access the mobile device 110 and perform service locally on the external computing device 140 via the locally-connected service system 200. For example, the remote service technician may help with problems in turning the external computing device 140 on, network connection issues, firewall issues, virtual private network issues, printer problems, hardware problems, viruses, malware, input/output devices locally connected to the external computing device 140, and any other local problems which may occur on the external computing device 140.

Figure 2:
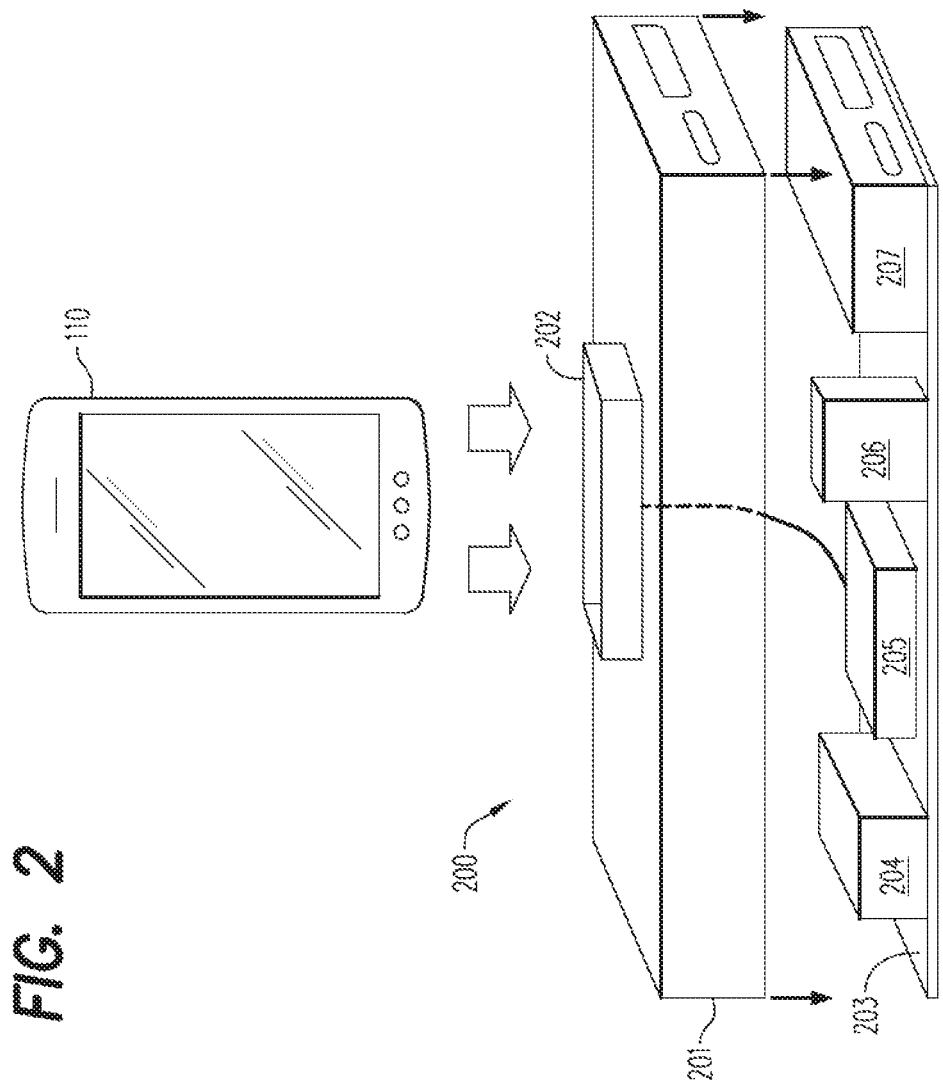
FIG. 2 is a diagram illustrating the locally-connected service system in accordance with an example embodiment.

FIG. 2 illustrates an exploded perspective of the locally-connected service system 200 in accordance with an example embodiment. Referring to FIG. 2, the locally-connected service system 200 includes a top component 201 which attaches to a bottom component 203, when sealed and in use. Here, the top and bottom components 201 and 203 are separated to provide a view of some example components that are internal within the locally-connected service system 200. In this example, the top component 201 may include a dock 202 which is able to electrically connect with the mobile device 110 when a bottom portion of the mobile device 110 is placed within an opening/slot of the dock 202.

Although not shown, the dock 202 may include a port that connects to a mini USB or other adapter of the mobile device 110 for direct/physical pairing with the mobile device 110. Furthermore, a cable may connect the dock 202 to a microprocessor 205. In this example, an exterior of the top component 201 is in the shape of a box, however, embodiments are not limited thereto, and other designs are possible. As another example, the locally-connected service system 200 may be a dongle that connects to the mobile device 110 via a cable, wireless network, or other attachment.

The bottom component 203 of the locally-connected service system 200 may include a circuit board, motherboard, plate, etc., which electrically connects the components 202, 204, 205, 206, 207, etc., disposed thereon. For example, the bottom component 203 may include a storage device 204 such as a RAM, a ROM, hard disk, and the like. The storage device 204 may store scripts, drivers, operating system images, and the like, which can be sent to the external computing device 140 based on instructions from the remote service technician. The bottom component 203 may include a keyboard emulator 206 which is configured to emulate keyboard signals of the external computing device 140.

The bottom component 203 may further include one or more adapters 207 such as a USB port, a serial cable port (e.g., server cable, console cable, etc.), a local network cable port, and the like, which can physically connect to the external computing device 140 via a cable that is plugged in to the corresponding adapter. Also, the one or more adapters 207 may further include a wireless network card which enables the locally-connected service system 200 to wirelessly connected to other devices such as the mobile device 110, the remote service device 120, or the like.

The bottom component 203 may include a microprocessor 205 which controls the operations of and communications between the components 202, 204, 205, 206, 207, etc. For example, the microprocessor 205 may provide an electrical connection between the adapter of the dock 202 receiving inputs from the mobile device 110, and the adapter 207 which connects to the external computing device 140. Thus, a physical path may be created from the mobile device 110 to the external computing device 140. Furthermore, the microprocessor 205 may connect to the keyboard emulator 206 to enable the keyboard emulator 206 to modify, convert, transform, etc. incoming data signals from the mobile device 110 into keyboard emulation signals (e.g., keyboard press signals) that can be input to the external computing device 140.

Figure 3:
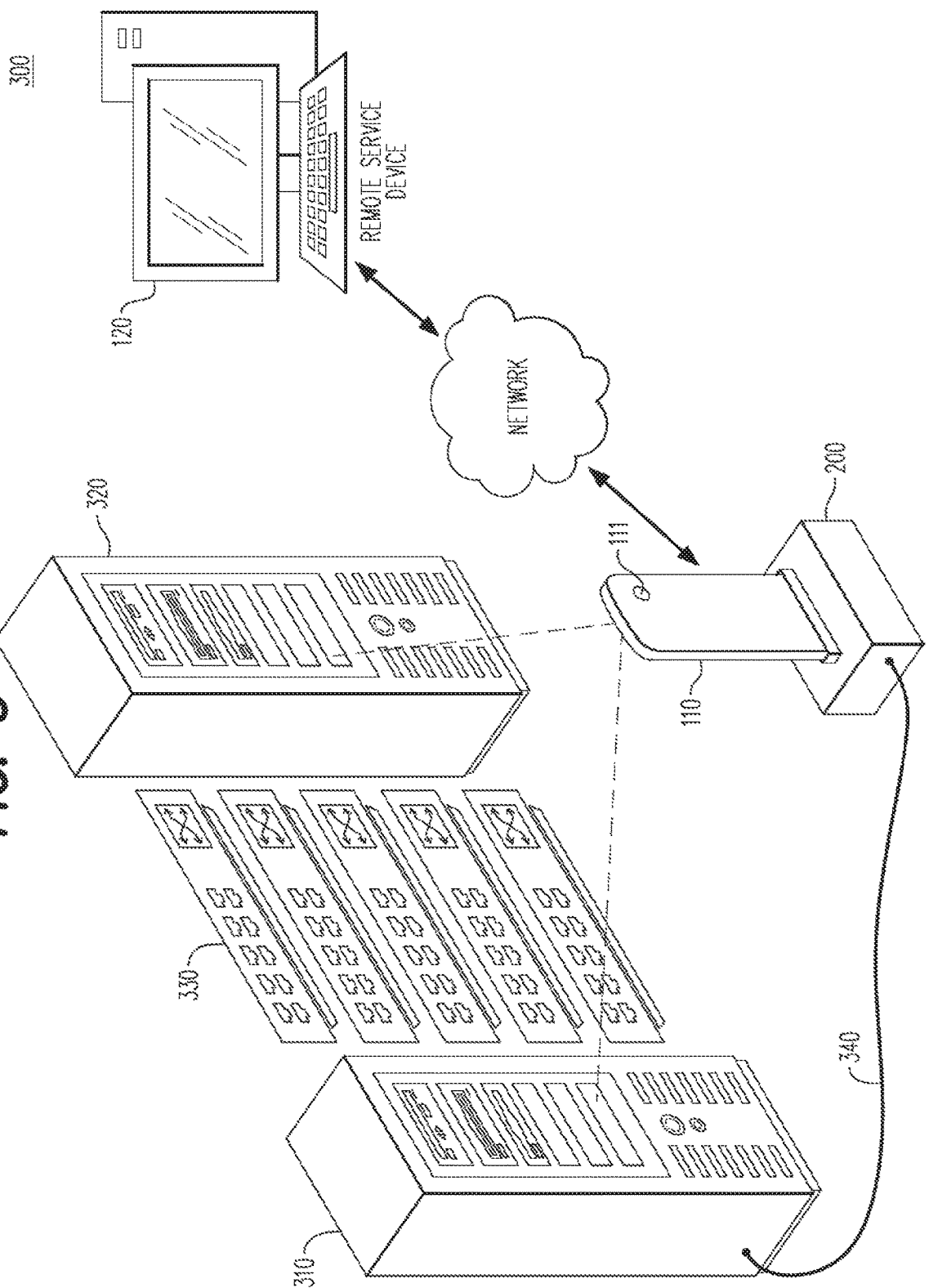
FIG. 3 is a diagram illustrating another environment including a locally-connected service system in accordance with example embodiments.

FIG. 3 illustrates another environment 300 including the locally-connected service system 200 in accordance with example embodiments. In this example, the locally-connected service system 200 connects to a server 310 among a group of servers 310 and 320. Here, the servers 310 and 320 also include a group of switches 330 which control cabling between the servers 310 and 320, and any other devices such as routers, back-up storage, terminals, etc., within a server room. In this example, the locally-connected service system 200 may include a serial port (console port, etc.) which enables a physical connection (e.g., via cable 340) between the locally-connected service system 200 and the server 310.

The mobile device 110 may receive commands from a remote service technician and input the commands to the locally-connected service system 200. In response, the commands may be converted into keyboard emulation signals and transmitted to the server 310. As another example, the remote service technician may issue commands to cause scripts stored on either the mobile device 110 or the locally-connected service system to be transmitted to the server 310. Thus, the remote service technician can run scripts for diagnostics, repair, testing, etc., on the server 310 as if the remote technician were located in the server room housing the server 310. Furthermore, the camera 111 may capture images of the cabling, connects, etc., in the server room and send the image data back to the remote service device 120 thereby allowing the remote service technician to visually inspect the cables and other equipment in the server room.

Figure 4:
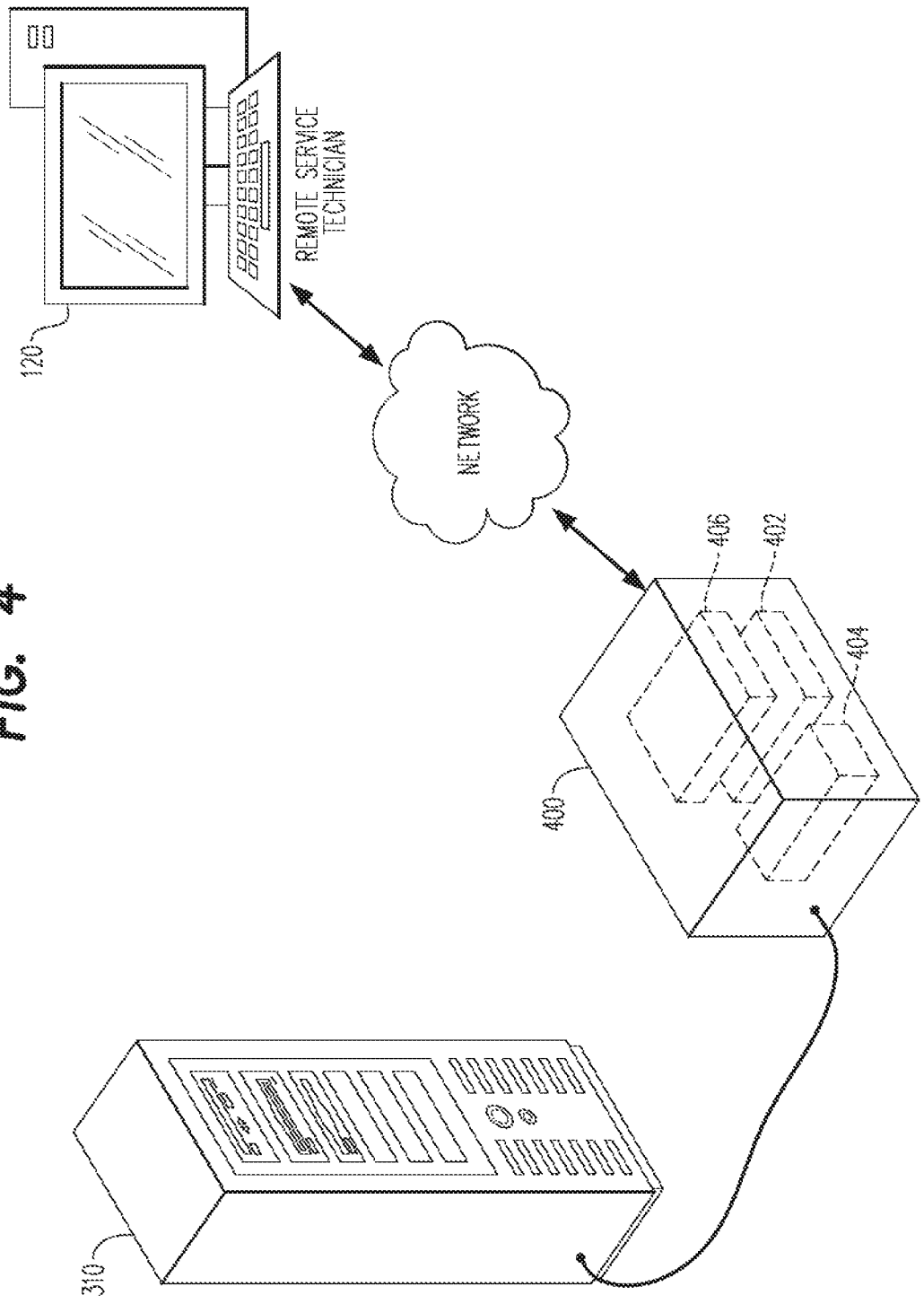
FIG. 4 is a diagram illustrating another example of a locally-connected service system in accordance with example embodiments.

FIG. 4 is a diagram illustrating another example of a locally-connected service system 400 in accordance with example embodiments. Referring to FIG. 4, in this example, the locally-connected service system 400 connects to the server 310 via the physical connection, however, the locally-connected service system 400 does not pair with a mobile device. Instead, the locally-connected service system 400 receives commands directly from the remote service device 120. Here, the locally-connected service system 400 may include all the features of the locally-connected service system 200 shown in FIGS. 1-3. In this example, the locally-connected service system 400 includes a microprocessor 402, a keyboard emulator 404, and a network card 406 that enables the locally-connected service system 400 to establish a wireless network connection with the remote service device 120. It should also be appreciated that the locally-connected service system 400 may include other components such as a storage, or the like. In this example, the locally-connected service system 400 may take another form such as a dongle, a hard drive, or the like.

In the example of FIG. 4, the remote service technician can control the locally-connected service system 400 directly instead of through a mobile device. Thus, the remote service device 120 can send keyboard commands which are received by the locally-connected service system 400, converted into keyboard emulation signals, and transmitted to the server 310 via the physical connection (cable).

Figure 5:
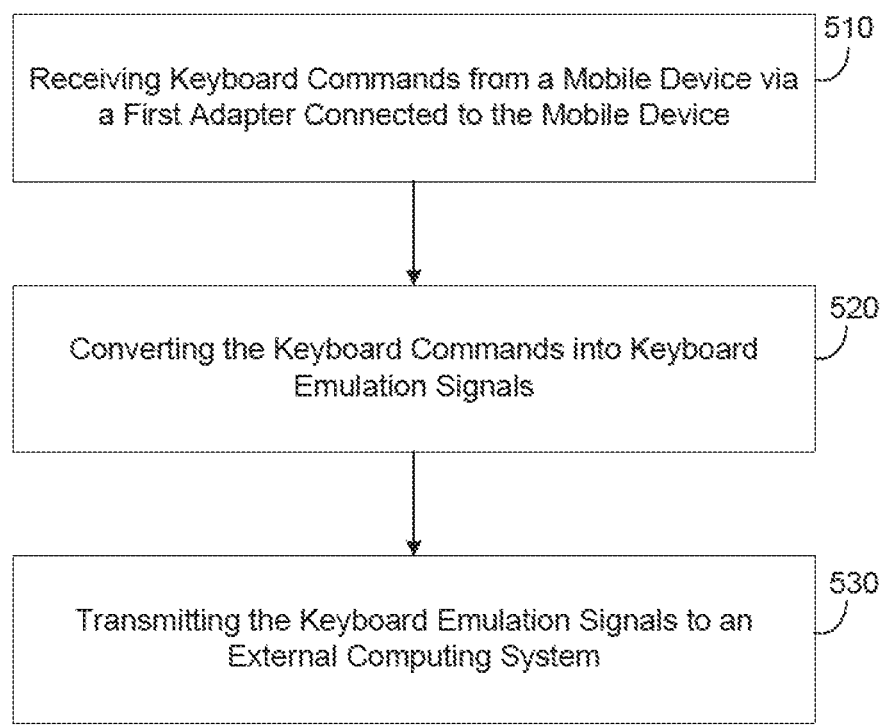
FIG. 5 is a diagram illustrating a method of remotely accessing a computing device through a locally-connected service system in accordance with an example embodiment.

FIG. 5 illustrates a method 500 of remotely accessing a device through a locally-connected service system in accordance with an example embodiment. For example, the method 500 may be performed by the locally-connected service system which is electrically paired with a mobile device via a dock, a cable, and/or the like. Referring to FIG. 5, in 510 the method may include receiving keyboard commands from a mobile device via a first adapter that is connected to the mobile device. For example, the keyboard commands may include key presses on a keyboard that is attached to a remote service device, or the like.

In 520, the method may include converting the received keyboard commands into corresponding keyboard emulation signals of an external computing system. For example, a keyboard emulator (e.g., a hardware keyboard emulator, a software keyboard emulator, etc.) may receive the input commands from the remote service technician, convert the input commands into keyboard inputs that are in the form of keyboard emulation signals, and transmit the keyboard emulation signals to the external computing system. In 530, the method may further include transmitting the keyboard emulation signals to the external computing system via a second adapter that is physically connected to the external computing system to control a local keyboard input of the external computing system.

In some embodiments, the converting is performed via a keyboard emulator that is communicably coupled to the first and second adapter via a processing device. In some embodiments, the first adapter may include a dock that is configured to plug into the mobile device via a port of the mobile device. In some embodiments, the second adapter may include at least one of a universal serial bus (USB) port and a serial port. In some embodiments, the method may further include transmitting scripts to the external computing system via the second adapter based on commands received from the mobile device via the first adapter. In some embodiments, the method may further include transmitting an image of an operating system to the external computing system via the second adapter based on commands received from the mobile device via the first adapter.

Figure 6:
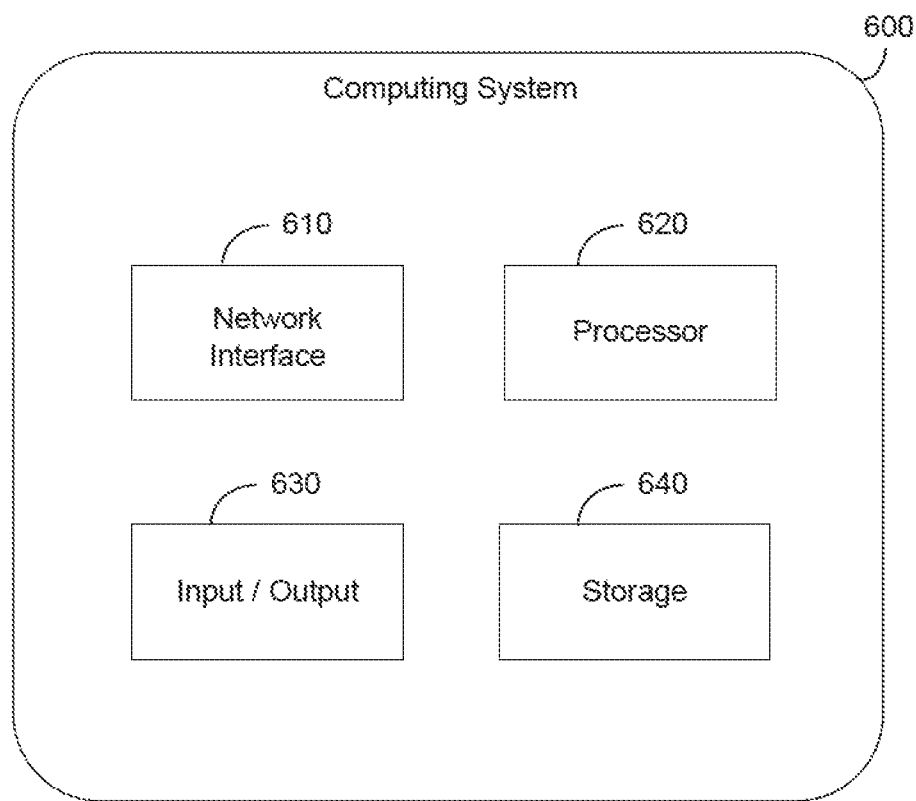
FIG. 6 is a diagram illustrating a computing system for use in the examples herein in accordance with an example embodiment.

FIG. 6 illustrates a computing system 600 that may be used in any of the methods and processes described herein, in accordance with an example embodiment. For example, the computing system 600 may be a mobile station dock, a mobile device, a troubled external device, or the like. In some embodiments, the computing system 600 may be distributed across multiple computing devices such as multiple database nodes.

Referring to FIG. 6, the computing system 600 includes a network interface 610, a processor 620, an input/output 630, and a storage device 640 such as an in-memory storage, and the like. Although not shown in FIG. 6, the computing system 600 may also include or be electronically connected to other components such as a microphone, a display, an input unit(s), a receiver, a transmitter, a persistent disk, and the like. The processor 620 may control or replace any of the other components of the computing system 600.

The network interface 610 may transmit and receive data over a network such as the Internet, a private network, a public network, an enterprise network, and the like. The network interface 610 may be a wireless radio interface, a wired interface such as a network card, a satellite communication interface, or a combination thereof. The processor 620 may include one or more processing devices each including one or more processing cores. In some examples, the processor 620 is a multicore processor or a plurality of multicore processors. Also, the processor 620 may be fixed or it may be reconfigurable. The input/output 630 may include an interface, a port, a cable, a bus, a board, a wire, and the like, for inputting and outputting data to and from the computing system 600. For example, data may be output to an embedded display of the computing system 600, an externally connected display, a display connected to the cloud, another device, and the like. The network interface 610, the input/output 630, the storage 640, or a combination thereof, may interact with applications executing on other devices.

The storage device 640 is not limited to a particular storage device and may include any known memory device such as RAM, ROM, hard disk, and the like, and may or may not be included within a database system, a cloud environment, a web server, or the like. The storage 640 may store software modules or other non-transitory instructions which can be executed by the processor 620 to perform the methods and processes described herein. The storage 640 may include a data store having a plurality of tables, partitions and sub-partitions. The storage 640 may be used to store database records, items, entries, and the like. Also, the storage 640 may be queried using SQL commands.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. An apparatus comprising:
a processor;
a universal serial bus (USB) port communicably coupled to the processor and configured to connect to an external computing system; and
an adapter communicably coupled to the processor and configured to connect to a mobile device,
wherein, when the external computing system and the mobile device are connected to the apparatus, the processor is configured to transmit a signal from the USB port of the apparatus to a USB port of the external computing device which identifies the apparatus as a physical keyboard and masks that the apparatus is not the physical keyboard, receive keyboard commands from the mobile device via the second adapter, and transmit keyboard emulation signals corresponding to the keyboard commands to the external computing system via the USB port to control a local keyboard input of the external computing system.

2. The apparatus of claim 1, wherein the apparatus further comprises a keyboard emulator configured to convert the received keyboard commands from the mobile device into the keyboard emulation signals and emulate a presence of a keyboard attached to the external computing system.

3. The apparatus of claim 1, wherein the adapter comprises a dock that is configured to plug into the mobile device via a port of the mobile device.

4. The apparatus of claim 1, wherein the adapter comprises a wireless network card configured to establish a wireless network connection with the mobile device.

5. The apparatus of claim 1, further comprising a storage configured to store scripts for the external computing system, wherein the processor is further configured to transmit the scripts to the external computing system via the USB port of the apparatus based on commands received from the mobile device via the adapter.

6. The apparatus of claim 1, further comprising a storage configured to store an image of an operating system of the external computing system, wherein the processor is further configured to transmit the image to the external computing system via the USB port based on commands received from the mobile device via the adapter.

7. An apparatus comprising:
a processor;
a universal serial bus (USB) port communicably coupled to the processor and configured to connect to an external computing system; and
a network interface communicably coupled to the processor and configured to receive commands from a remote network device,
wherein, when the external computing system is connected to the apparatus, the processor is configured to transmit a signal from the USB port of the apparatus to a USB port of the external computing device which identifies the apparatus as a physical keyboard and masks that the apparatus is not the physical keyboard, receive keyboard commands from the remote network device via the network interface, and transmit keyboard emulation signals corresponding to the keyboard commands to the external computing system via the USB port to control a local keyboard input of the external computing system.

8. The apparatus of claim 7, wherein the apparatus further comprises a keyboard emulator configured to convert the received keyboard commands from the remote network device into the keyboard emulation signals and emulate a presence of a keyboard attached to the external computing system.

9. The apparatus of claim 7, further comprising a storage configured to store scripts for the external computing system, wherein the processor is further configured to transmit the scripts to the external computing system via the USB port based on commands received from the remote network device via the network interface.

10. The apparatus of claim 7, further comprising a storage configured to store an image of an operating system of the external computing system, wherein the processor is further configured to transmit the image to the external computing system via the USB port based on commands received from the remote network device via the network interface.

11. A method comprising:
receiving keyboard commands from a mobile device via an adapter that is connected to the mobile device and which is included in an apparatus;
converting the received keyboard commands into corresponding keyboard emulation signals of an external computing system;
transmitting a signal from a USB port of the apparatus to a USB port of the external computing device which identifies the apparatus as a physical keyboard and masks that the apparatus is not the physical keyboard; and
transmitting the keyboard emulation signals to the external computing system via the USB port to control a local keyboard input of the external computing system.

12. The method of claim 11, wherein the converting is performed via a keyboard emulator that is communicably coupled to the adapter and the USB port via a processing device.

13. The method of claim 11, wherein the adapter comprises a dock that is configured to plug into the mobile device via a port of the mobile device.

14. The method of claim 11, further comprising transmitting scripts to the external computing system via the USB port based on commands received from the mobile device via the adapter.

15. The method of claim 11, further comprising transmitting an image of an operating system to the external computing system via the USB port based on commands received from the mobile device via the adapter.

* * * * *